United States Patent Office 3,561,965
Patented Feb. 9, 1971

3,561,965
VESICULAR COMPOSITIONS AND PHOTOGRAPHIC ELEMENTS CONTAINING CHLORINATED POLYOLEFINS
James G. McNally, Jr., Rochester, N.Y., assignor to Eastman Kodak Company, Rochester, N.Y., a corporation of New Jersey
No Drawing. Filed July 31, 1967, Ser. No. 657,050
Int. Cl. G03c *1/52, 1/72*
U.S. Cl. 96—75                                          7 Claims

ABSTRACT OF THE DISCLOSURE

Polyolefins having a molecular weight of from about 5,000 to about 38,000, when chlorinated to a depth of from about 45 to about 75 weight percent, based upon the chlorinated resin, are useful as the polymeric matrix for vesicular compositions which can be used in photographic elements. The scope of the present invention is designated by the following specification and claims.

---

This invention relates to photography and, more particularly, is concerned with vesicular compositions and with photographic elements utilizing such vesicular compositions.

As is well known, vesicular compositions essentially comprise a gas-forming or photoblowing agent uniformly dispersed in a thermoplastic matrix. The photoblowing agent is a compound which, on exposure to radiation, especially short wave radiation such as ultraviolet light or near ultraviolet light, decomposes with an associated formation of gas. The most common photoblowing agents are those having a diazo group ($-N=N^{\oplus}$) or an azido group ($-N_3$), which release nitrogen on decomposition. These compounds are well known to the art and form no part of this invention.

The second active component of a vesicular composition is the polymeric matrix. As is known to those of ordinary skill in the art, the matrix polymer must possess several properties, such as thermoplasticity, hydrophobicity, inertness to the photoblowing agent or its decomposition residues, desirable degree of impermeability to gas and the like.

In the past many polymers have been employed as the matrix. However, no polymer has been found which is generally satisfactory in terms of the above mentioned properties or additional factors such as cost, solubility in common solvents, ease of handling, thermal stability and the like. As a result blends of two or more polymers frequently have been employed.

Accordingly, it is an object of this invention to provide new matrix polymers for vesicular compositions, which polymers exhibit lower glass transition temperatures, more extensive solubility and improved adhesion to support materials.

It is another object of this invention to provide novel matrix polymers for vesicular compositions which exhibit improved thermal stability and aging characteristics.

It is also the object of this invention to provide novel vesicular compositions and photographic elements for producing images by vesicular means.

These and other objects of this invention are accomplished with light-sensitive vesicular compositions which comprise an image-forming amount of a photoblowing agent substantially uniformly dispersed in a polymeric matrix comprising a polyolefin having an average molecular weight of from about 5,000 to about 38,000, which polyolefin has been chlorinated to provide a polyolefin composition containing from about 45 to about 75 weight percent chlorine.

By the term "polyolefin," as employed herein, is meant a polymer of an aliphatic lower monoolefin, i.e., a compound of the general empirical formula $C_nH_{2n}$, wherein $n$ is an integer having a value of from 2 to about 6, inclusive. Preferred are such poly-$\alpha$-olefins as polyethylene and polypropylene. In addition to homopolymers, copolymers with one or more carbonyl-containing comonomers, such as carbon monoxide, vinyl acetate, ethyl acrylate, maleic anhydride and the like, can be employed, provided the comonomer comprises less than about 20 weight percent of the copolymers. The nature of the copolymer can be widely varied, however, and graft copolymers or interpolymers can be employed. The molecular weights referred to herein can be determined by standard techniques, the Rast method for example.

Aside from molecular weight, the physical characteristics of the olefin polymer are susceptible of extensive variation. Thus, the polyolefin can be high or low density, crystalline or amorphous and the like.

As indicated above, the degree of chlorination should be from about 45 to about 75 weight percent, inclusive, based upon the chlorinated resin. A preferred range of chlorination is from about 58 to about 63 weight percent, inclusive, for within this range the chlorinated polyolefin exhibits a sharp permeability minimum.

The chlorinated polyolefin can be produced in any desired manner. A preferred technique comprises treating a solution of the polymer in a solvent, such as carbon tetrachloride, at about 65° to about 75° C. with chlorine in the presence of a peroxide catalyst such as hydrogen peroxide.

An illustrative preparation of chlorinated polyolefins useful in the invention is as follows: The polyolefin is first slurried or dissolved in carbon tetrachloride. Such a composition is then pumped into a reactor and heated to 65–75° C. at atmospheric pressure. A peroxide catalyst is added at the beginning of the reaction and then as needed. Gaseous chlorine is introduced into the agitated solution until the desired chlorine content is reached. One mole of hydrogen chloride is produced for each mole of chlorine used up in the reaction. When the desired chlorination has been obtained, excess chlorine and by-product hydrogen chloride are stripped out by flashing the chlorinated polyolefin solution with hot water and boiling. A water-polyolefin slurry is then passed first through a rotary drum type vacuum filter to remove water, and then through a final drier after which dry chlorinated polyolefin is obtained.

The chlorinated polyolefins employed in accordance with this invention are superior to vinyl chloride and vinylidene chloride polymers in one or more of the following respects: (1) more extensive solubility, particularly in chlorinated solvents; (2) lower glass transition temperatures, permitting lower development temperatures; (3) improved adhesion to the support materials, such as cellulose acetate and poly(ethylene terephthalate), in vesicular film compositions; and (4) improved thermal stability and aging characteristics, e.g., a reduced tendency to generate hydrogen chloride on heating or aging.

The chlorinated polyolefin can be employed in any suitable manner. Thus, it is advantageously admixed with a photoblowing agent, preferably in a common solvent. The particular photoblowing agent is susceptible of extensive variation, but such nitrogen-forming agents as those having at least one diazo group ($-N=N^{\oplus}$) or azido group ($-N_3$) are preferred. Typical of such compounds include, for example, diazonium salts such as p-diethylaminobenzenediazoniumchlorozincate, carbazides such as 1-hydroxy-2-carbazidonaphthol and azides such as 4-azidophthalic anhydride. Carbazides are particularly useful due to their increased solubility and increased light sensitivity. The amount of the photoblowing agent is subject to wide variation, provided at least an image-forming amount, i.e., an amount sufficient to form an image after exposure and development, is employed. In general, this amount is in the range of from about 2 to about 20 weight percent, based upon total light-sensitive vesicular composition, with amounts of from about 2 to about 10 percent being preferred.

Although additives, such as plasticizers, hardeners, coloring agents and the like are generally unnecessary, they can be present in the present light-sensitive compositions if desired. It is a feature of this invention, however, that such modifiers ordinarily are not required.

The present light-sensitive compositions are typically coated on a support material to provide a positive-working or negative-working photographic element which, upon at least one imagewise exposure to ultraviolet or actinic radiation and subsequent heating, produces a visible photographic image. The choice of a method of coating can be widely varied, with doctor blade and hopper coating methods being suitably employed. Likewise, the choice of a support material can be widely varied. Typical supports include such conventional film supports as: cellulose esters like cellulose nitrate, cellulose acetate and cellulose acetate butyrate; other polymeric materials like poly(ethylene terephthalate) and polystyrene; paper including polyethylene and polypropylene-coated paper and the like. The choice of the support used depends upon the particular use to which the photographic element will be devoted. Photographic elements so produced exhibit advantageous storage characteristics; they can be retained for long periods of time at substantially elevated temperatures without significant degradation and evolution of hydrogen chloride from the chlorinated polyolefin binder material.

After an imagewise exposure to actinic radiation, causing the decomposition of the photoblowing agent and the concomitant release of a gas such as nitrogen bubbles, the photographic element is heated to effect the expansion of such gas bubbles and thereby produce a visible photographic image in the light-struck areas. Heating can be carried out by any convenient means, such as infrared radiation or a heated roll, but it must be performed rather soon after the initial imagewise exposure to actinic light since the photo-generated gas bubbles tend to diffuse out of the light-sensitive layer. A wide range of elevated temperatures can be used in processing the present exposed photographic elements, the processing temperature typically varying with the time of exposure to such temperature (e.g., 40–150° C.). Photographic elements processed as described hereinabove are negative-working and produce high quality developed images.

Alternatively, the photographic elements described herein, with suitable processing, function in positive fashion. A photographic element is first exposed to a source of actinic radiation. The gas bubbles generated on such an exposure are allowed to diffuse out of the light-sensitive layer, whereupon the element is given a uniform, intense over-all exposure to a source rich in ultraviolet radiation and heated to produce a visible photographic image in the previously non-light-struck areas. Such a photographic image is a positive reproduction of the original.

After suitable processing, the developed elements can be stored at substantially elevated temperatures without significant evolution of hydrogen chloride from the chlorinated polyolefin binder material.

The invention is further illustrated by the following examples which include preferred embodiments thereof.

EXAMPLE 1

A polyethylene resin having an average molecular weight of about 10,000 is chlorinated in carbon tetrachloride by reaction with chlorine in the presence of hydrogen peroxide at 70° C. to provide a chlorinated polymer containing 57.2 weight percent chlorine and having an inherent viscosity of 0.41 in methyl ethyl ketone, as determined from a 0.25 weight percent solution employing an Oswald viscometer. A solution is then prepared containing 2 parts by weight of α-carbazidonaphthol, 23 parts by weight of the chlorinated polyethylene and 75 parts by weight of methyl ethyl ketones. This solution is then coated on 2.5 mil poly(ethylene terephthalate) film with a coating blade and dried at 70° C. for one hour, providing a light-sensitive photographic element. The dried coating thickness is 0.5 mil.

(A) A portion of the prepared photographic element is exposed through a 0.15 log E step tablet to a strong source of actinic radiation at a distance of 1 inch for 3 minutes, and then immediately passed through the heated rollers of a vesicular film developer at 100° C. In the developed area there are 4 visible steps having specular densities (at a 24° collection angle) of 1.70, 1.69, 1.62 and 1.02 with a background density of 0.06, corresponding to a speed of 20 (speed is defined as 1,000 divided by exposure time, in seconds, required to obtain a density of 1.0).

(B) A second portion of the photographic element is given a brief uniform exposure to a mercury arc light source sufficient to produce a density of 0.40, then heated at 45° C. for 2 hours to equilibrate the light-sensitive layer. It is then exposed and developed as described in part A. There are obtained 15 visible steps ranging in density from 1.61 to 0.10 at a background density of 0.06, corresponding to a speed of 143.

(C) A third portion of the photographic element is exposed through a line negative to a 1,200 watt high pressure mercury lamp, rich in ultraviolet radiation, for 5 seconds at a distance of 3 inches by passing the test strip and overlay through an exposure unit at a rate of 10 feet per minute. After developing as described in part A, a sharp, dense image is obtained.

EXAMPLE 2

Employing procedures similar to those described in Example 1, polyethylene having an average molecular weight of about 21,000 is chlorinated to provide a polymer containing 63.3 weight percent chlorine and having an inherent viscosity of 0.67 as determined in Example 1. A solution of 16.5 parts of this polymer, 1.5 parts of α-carbazidonaphthol and 82 parts of methyl ethyl ketone is coated on 2.5 mil poly(ethylene terephthalate) with a coating knife and dried at 70° C. for one hour. The dry film thickness is 0.5 mil.

(A) A portion of this photographic element is preflashed as described in Example 1–B to a density of 0.35, and then exposed as described in Example 1–A and developed at 120° C. Eleven visible steps are obtained with a maximum density of 1.58, corresponding to a speed of 108.

(B) A second portion of this photographic element is exposed as described in Example 1–C and developed at 120° C. Sharp distinct images are obtained.

EXAMPLE 3

Polyethylene having an average molecular weight of about 7,000 is chlorinated to provide a polymer containing 65.5 weight percent chlorine and having an inherent viscosity of 0.26 as determined in Example 1. A solution of 9.1 parts by weight of this polymer, 0.9 part by weight of α-carbazidonaphthol and 90 parts by weight of methyl ethyl ketone is coated on a 2.5 mil poly(ethylene terephthalate) with a coating knife to produce a photographic element bearing a 0.4 mil light-sensitive layer after curing at 25° C. for 24 hours. Sharp, clear images are obtained upon exposure of this element as described in Example 1–C and developing at 120° C. as described in Example 1.

EXAMPLE 4

A polyethylene having an average molecular weight of about 8,000 is chlorinated to provide a polymer containing 65 weight percent chlorine and having an inherent viscosity of 0.08 as determined in Example 1. A solution of 9.1 parts of this polymer, 0.9 part of α-carbazidonaphthol and 90 parts of methyl ethyl ketone is coated on 2.5 mil unsubbed poly(ethylene terephthalate) with a coating knife to give a 0.4 mil dry thickness coating. A portion of this photographic element is exposed as described in Example 1–C and developed at 120° C. as described in Example 1 to give high density, sharply defined images.

EXAMPLE 5

A graft polymer having an average molecular weight of about 30,000 composed of about 2% maleated low density polyethylene (i.e., treated with maleic anhydride) is chlorinated to provide a product containing 69.8 weight percent chlorine and having an inherent viscosity of 0.45 as determined in Example 1. A solution of 23 parts by weight of this polymer, 2 parts by weight of α-carbazidonaphthol and 75 parts by weight of methyl ethyl ketone is coated on 2.5 mil poly(ethylene terephthalate) with a coating knife and cured at 70° C. for one hour to provide a photographic element bearing a 0.6 mil thick light-sensitive layer.

(A) A portion of this element is exposed as described in Example 1–A and then developed at 120° C. on a hot mandrel. Two visible steps are produced having densities of 1.22 and 0.48 with a background density of 0.06.

(B) A second portion of such element is given a uniform preflash exposure by passing it through an exposure unit as described in Example 1–C at a rate of 30 feet per minute. After equilibration as described in Example 1–B and exposure and developing as described in part A above, seven steps are reproduced having a maximum density of 1.58.

EXAMPLE 6

A low density polyethylene having an average molecular weight of about 30,000 is chlorinated to provide a polymer containing 61.4 weight percent of chlorine and having an inherent viscosity of 0.61 in methyl ethyl ketone. A solution of 29.3 parts by weight of this polymer, 2.5 parts of α-carbazidonaphthol and 68.2 parts by weight of methyl ethyl ketone is coated on a poly(ethylene terephthalate) support material by means of a coating blade and is dried at 65° C. for 45 minutes. The resulting photographic element's dry light-sensitive layer is 0.2 mil thick. A portion of the photographic element so prepared is exposed for 5 seconds behind a half-tone silver positive to a mercury arc light source rich in ultraviolet radiation. Immediately thereafter the imagewise exposed element is given an intense, uniform exposure to a mercury arc light source, rich in ultraviolet rays, and heated to give a positive reversal image which is a high quality photographic reproduction of the original pattern.

Although the invention has been described in detail with particular reference to preferred embodiments thereof, modifications and variations can be effected within the spirit and scope of the invention as described above and as defined in the following claims.

I claim:

1. In a light-sensitive vesicular composition comprising an image-forming amount of a photoblowing agent substantially uniformly dispersed in a polymeric matrix, the improvement which comprises using as said polymeric matrix a composition comprising one selected from the group consisting of:

(a) a homopolymer polyethylene having an average molecular weight of from about 5,000 to about 38,000, said polyethylene or polypropylene having been chlorinated to contain from about 45 to about 75 weight percent chlorine, and (b) copolymers of said chlorinated polyethylene with from 1 to about 20 weight percent, based on the weight of the copolymer, of a carbonyl-containing comonomer selected from the group consisting of carbon monoxide, vinyl acetate, ethyl acrylate and maleic anhydride.

2. A composition as defined by claim 1 wherein the chlorinated polyethylene contains from about 58 to about 63 weight percent chlorine.

3. A composition as defined by claim 1 wherein the photoblowing agent releases nitrogen on exposure to actinic radiation.

4. In a light-sensitive vesicular composition comprising an image-forming amount of a carbazide photoblowing agent which releases nitrogen on exposure to actinic radiation substantially uniformly dispersed in a polymeric matrix, the improvement which comprises using as said polymeric matrix a polyethylene as defined in claim 1 having an average molecular weight of from about 5,000 to about 38,000 and which polyethylene has been chlorinated to provide a chlorinated polyethylene composition containing from about 45 to about 75 weight percent chlorine.

5. A light-sensitive vesicular composition as defined by claim 4 wherein the carbazide is α-carbazidonaphthol.

6. A photographic element comprising a support having coated thereon the light-sensitive vesicular composition defined by claim 1.

7. A photographic element as described in claim 6, wherein the support comprises poly(ethylene terephthalate).

References Cited

UNITED STATES PATENTS

| 2,703,756 | 3/1955 | Herrick et al. | 96—91X |
| 2,865,932 | 12/1958 | MacMullen et al. | 260—2.5X |
| 2,913,424 | 11/1959 | Gumboldt et al. | 260—2.5 |
| 3,143,418 | 8/1964 | Priest et al. | 96—91N |
| 3,183,091 | 5/1965 | Sporer et al. | 96—48 |
| 3,032,414 | 5/1962 | James et al. | 96—49X |
| 3,341,481 | 9/1967 | Palmer | 260—2.5 |
| 3,335,101 | 8/1967 | Kraemer et al. | 260—2.5 |
| 3,355,295 | 11/1967 | Priest | 96—49X |
| 3,484,352 | 12/1969 | Cines et al. | 260—2.5X |
| 3,498,934 | 3/1970 | Kraemer et al. | 260—2.5 |

OTHER REFERENCES

Modern Plastic Encyclopedia, September 1965, vol. 43 No. 1A., p. 270.

Schildknecht, C. E., "Vinyl and Related Polymers," 1951, pp. 512, 527–528.

NORMAN G. TORCHIN, Primary Examiner

C. L. BOWERS, JR., Assistant Examiner

U.S. Cl. X.R.

96—48, 49, 91, 115; 260—2.25